(12) United States Patent
Jang et al.

(10) Patent No.: US 9,692,037 B2
(45) Date of Patent: Jun. 27, 2017

(54) RECHARGEABLE BATTERY

(71) Applicant: SAMSUNG SDI CO., LTD., Yongin-si, Gyeonggi-do (KR)

(72) Inventors: Myung-Jae Jang, Yongin-si (KR); Sang-Won Byun, Yongin-si (KR); Chi-Young Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 3 days.

(21) Appl. No.: 14/829,552

(22) Filed: Aug. 18, 2015

(65) Prior Publication Data

US 2016/0260956 A1 Sep. 8, 2016

(30) Foreign Application Priority Data

Mar. 2, 2015 (KR) .................. 10-2015-0029329

(51) Int. Cl.
| | |
|---|---|
| *H01M 2/00* | (2006.01) |
| *H01M 2/34* | (2006.01) |
| *H01M 2/30* | (2006.01) |
| *H01M 2/08* | (2006.01) |

(52) U.S. Cl.
CPC .............. *H01M 2/34* (2013.01); *H01M 2/08* (2013.01); *H01M 2/30* (2013.01); *H01M 2200/103* (2013.01)

(58) Field of Classification Search
CPC ......... H01M 2200/00; H01M 2220/20; H01M 2/0237; H01M 2/30; H01M 2/34
See application file for complete search history.

(56) References Cited

U.S. PATENT DOCUMENTS

| | | | |
|---|---|---|---|
| 9,023,498 B2 | 5/2015 | Kim et al. | |
| 2013/0196179 A1* | 8/2013 | Han .................. | H01M 2/04 429/7 |
| 2013/0337306 A1* | 12/2013 | Han .................. | H01M 2/1016 429/99 |

FOREIGN PATENT DOCUMENTS

| | | |
|---|---|---|
| KR | 10-2013-0006280 A | 1/2013 |
| KR | 10-2013-0089134 A | 8/2013 |

* cited by examiner

*Primary Examiner* — Patrick Ryan
*Assistant Examiner* — Ben Lewis
(74) *Attorney, Agent, or Firm* — Lewis Roca Rothgerber Christie LLP

(57) ABSTRACT

A rechargeable battery includes: an electrode assembly; a case housing the electrode assembly; a cap plate closing and sealing an opening of the case; an electrode terminal at an outside of the cap plate with respect to the case, extending through an opening in the cap plate, and electrically connected to the electrode assembly; and an insulating member between the electrode terminal and the cap plate. The electrode terminal includes: a first plate terminal electrically connected to the electrode assembly; a second plate terminal spaced from the first plate terminal; and a fuse connecting the first plate terminal and the second plate terminal and being at least partially surrounded by the insulating member.

10 Claims, 7 Drawing Sheets

RECHARGEABLE BATTERY

CROSS-REFERENCE TO RELATED APPLICATION

This application claims priority to and the benefit of Korean Patent Application No. 10-2015-0029329, filed in the Korean Intellectual Property Office on Mar. 2, 2015, the entire contents of which are incorporated herein by reference.

BACKGROUND

1. Field

Embodiments of the present invention relate to a rechargeable battery.

2. Description of the Related Art

A rechargeable battery is designed to be repeatedly charged and discharged, unlike a primary battery. A rechargeable battery having a relatively small capacity may be used in (e.g., to power or as a power source for) a small portable electronic device, such as a mobile phone, a laptop computer, or a camcorder, and a rechargeable battery having a relatively large capacity may be used as a power source for driving a motor of a hybrid vehicle or an electric vehicle.

A rechargeable battery generally includes an electrode assembly that performs a charge and discharge operation (e.g., may be charged and discharged), a case that houses or accommodates the electrode assembly and an electrolyte solution, a cap plate that is coupled to an opening of the case, an electrode terminal that is installed in the cap plate, and a lead tab that connects the electrode terminal and the electrode assembly.

The rechargeable battery may have a fuse in the lead tab that is disposed within the case to cut-off or block a current flow in response to an overcurrent, and the rechargeable battery may also have an external short circuit portion at the outside of the cap plate to cut-off or block a current flow upon overcharging.

However, when the fuse at the inside of the rechargeable battery is cut (e.g., is melted), an arc may occur. Because the arc cannot be easily controlled, when the fuse reconnects (e.g., when the two disconnected portions of the fuse are connected due to, for example, arcing), a short circuit may occur in the external short circuit portion.

The above information disclosed in this Background section is only for enhancement of understanding of the background of the invention, and it may contain information that does not form the prior art that is already known to a person of ordinary skill in the art.

SUMMARY

Aspects of the present invention provide a rechargeable battery in which a fuse is at the outside of a case such that an arc is prevented from occurring at the inside of the case when the fuse is cut.

An exemplary embodiment of the present invention provides a rechargeable battery including: an electrode assembly; a case housing the electrode assembly; a cap plate closing and sealing an opening of the case; an electrode terminal at an outside of the cap plate with respect to the case, extending through an opening in the cap plate, and being electrically connected to the electrode assembly; and an insulating member between the electrode terminal and the cap plate. The electrode terminal includes: a first plate terminal electrically connected to the electrode assembly; a second plate terminal spaced from the first plate terminal; and a fuse connecting the first plate terminal and the second plate terminal, wherein the fuse is at least partially surrounded by the insulating member.

The insulating member may include: a first receiving portion configured to accommodate the first plate terminal; a second receiving portion configured to accommodate the second plate terminal; and a cell barrier portion between the first receiving portion and the second receiving portion and at least partially surrounding the fuse.

The cell barrier portion may have a concave groove configured to support the fuse, and side surfaces of the concave groove may at least partially surround the fuse.

The electrode terminal may include a negative electrode terminal connected to a negative electrode of the electrode assembly and a positive electrode terminal connected to a positive electrode of the electrode assembly, wherein the negative electrode terminal may include a rivet terminal connected to the negative electrode, and wherein the rivet terminal may extend through the first receiving portion and an opening in the first plate terminal to be coupled thereto.

The positive electrode terminal may include: a rivet terminal connected to the positive electrode; a top plate electrically connected to the cap plate; and a plate terminal electrically connecting the top plate and the rivet terminal, wherein the rivet terminal may extend through and be insulated from the top plate and may be connected to the plate terminal at an opening therein.

The fuse may have a smaller width than that of the first plate terminal or the second plate terminal.

The fuse may have a smaller thickness than that of the first plate terminal or the second plate terminal.

The electrode terminal may include a negative electrode terminal connected to a negative electrode of the electrode assembly and a positive electrode terminal connected to a positive electrode of the electrode assembly, wherein the positive electrode terminal may include: a rivet terminal connected to the positive electrode; and a top plate electrically connected to the cap plate, and wherein the rivet terminal may extend through and be insulated from the top plate and may be connected to the first plate terminal at an opening therein.

The insulating member may include: a receiving portion housing the second plate terminal; and a cell barrier portion at least partially surrounding the fuse and being at one side of the receiving portion.

The cell barrier portion may have a concave groove supporting the fuse, and side surfaces of the concave groove may at least partially surround the fuse.

The negative electrode terminal may include a rivet terminal connected to the negative electrode, wherein the rivet terminal may extend through the insulating member and may be connected a plate terminal at an opening therein.

According to an exemplary embodiment of the present invention, a first plate terminal and a second plate terminal of an electrode terminal are connected with a fuse at the outside of a cap plate, and the fuse is at least partially surrounded by an insulating member. Thus, when the fuse is cut, an arc is prevented from occurring at the inside of the rechargeable battery.

DETAILED DESCRIPTION

Figure 1:
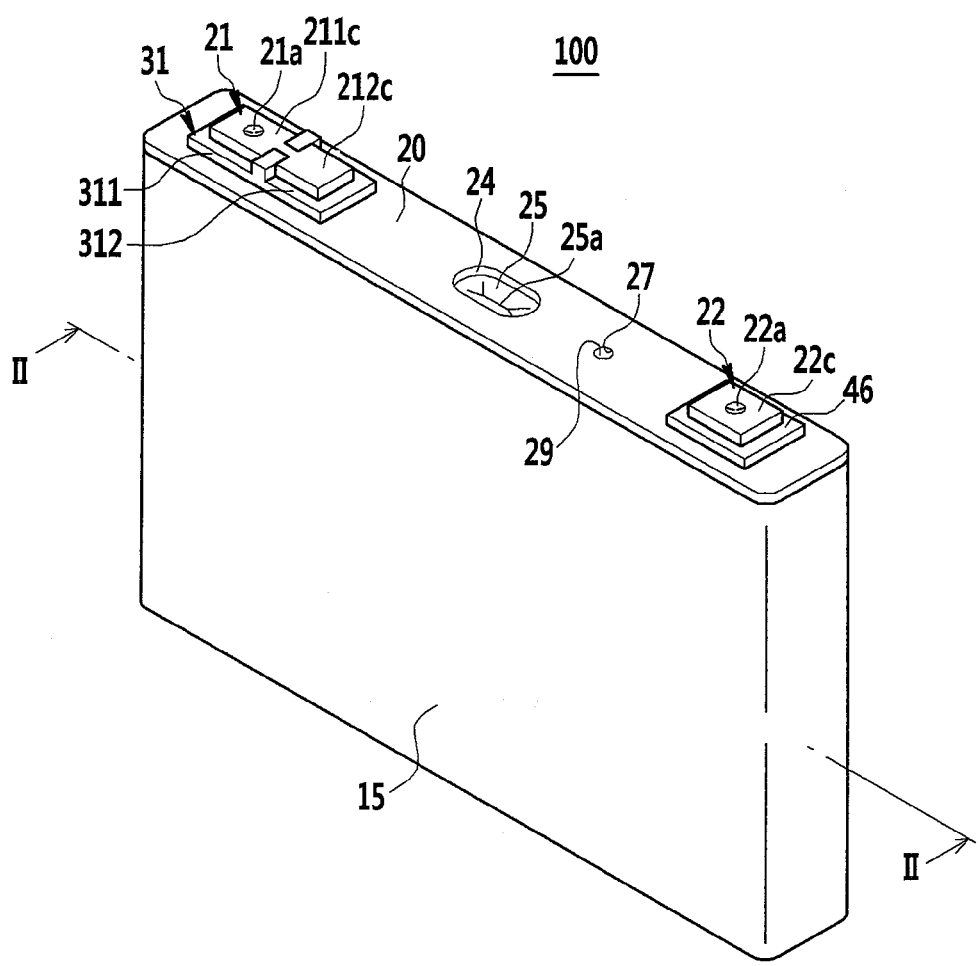
FIG. 1 is a perspective view illustrating a rechargeable battery according to a first exemplary embodiment of the present invention.

Aspects of the present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention". Expressions, such as "at least one of," when preceding a list of elements, modify the entire list of elements and do not modify the individual elements of the list. Also, the term "exemplary" is intended to refer to an example or illustration.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

The terminology used herein is for the purpose of describing particular example embodiments only and is not intended to be limiting of example embodiments. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
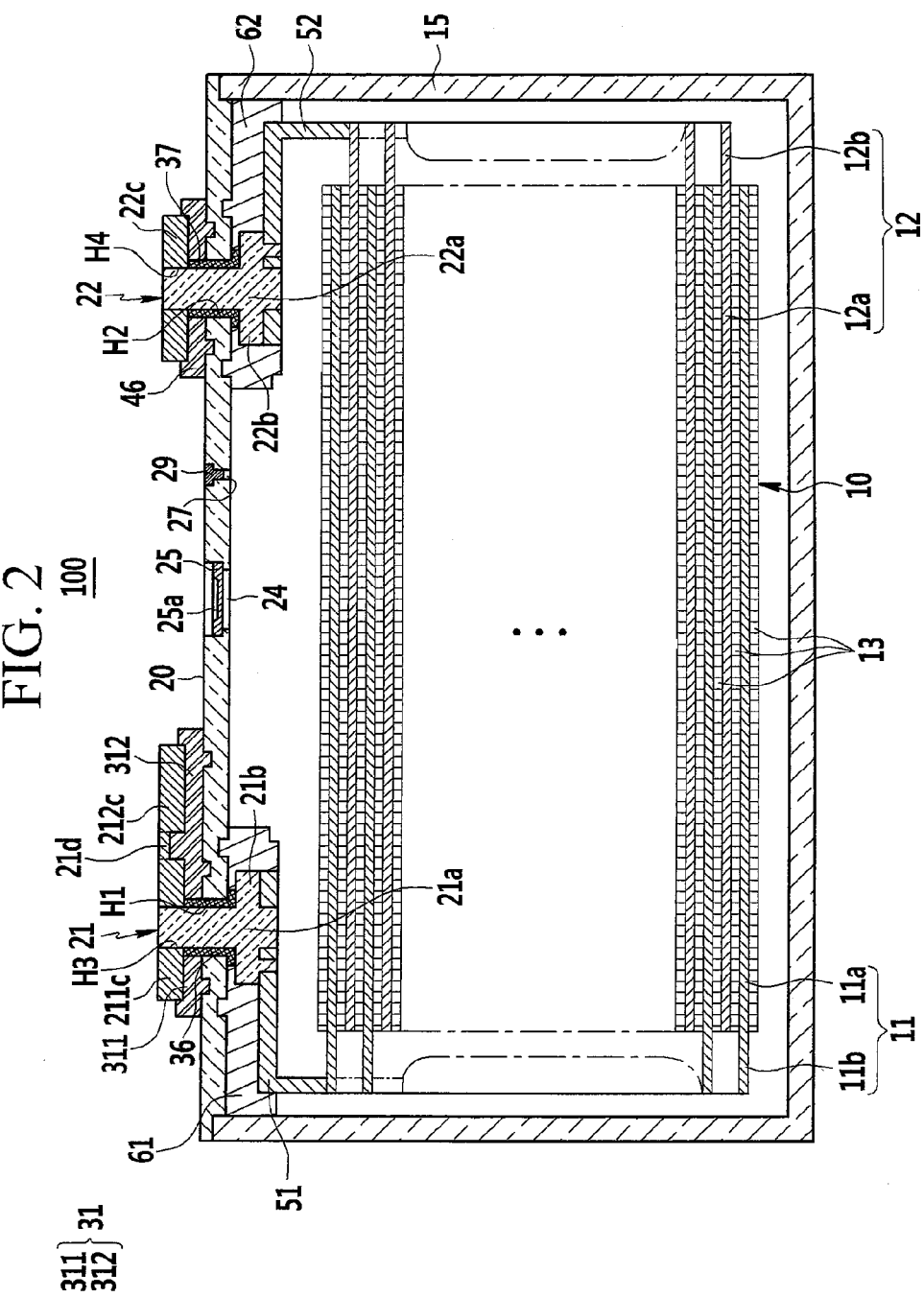
FIG. 2 is a cross-sectional view illustrating the rechargeable battery taken along the line II-II of FIG. 1.

FIG. 1 is a perspective view illustrating a rechargeable battery according to a first exemplary embodiment of the present invention, and FIG. 2 is a cross-sectional view illustrating the rechargeable battery taken along the line II-II of FIG. 1.

Referring to FIGS. 1 and 2, a rechargeable battery 100 according to the first exemplary embodiment includes an electrode assembly 10 that charges and discharges a current (e.g., that is configured to be charged and discharged), a case 15 that houses or accommodates the electrode assembly 10 and an electrolyte solution, a cap plate 20 that closes and seals an opening of the case 15, electrode terminals (e.g., negative and positive electrode terminals 21 and 22, respectively) that are installed at the outside of the cap plate 20 (e.g., at the outside of the cap plate 20 with respect to the case 15) and extend through terminal openings H1 and H2 (e.g., terminal holes) of the cap plate 20, and an insulating member 31 that is between and electrically insulates the negative electrode terminal 21 and the cap plate 20 from each other.

For example, the electrode assembly 10 is formed by disposing electrodes (e.g., a negative electrode 11 and a positive electrode 12) at respective surfaces of a separator 13, which is an insulator, and spirally-winding the negative electrode 11, the separator 13, and the positive electrode 12 into a jelly-roll shape or state.

The negative electrode 11 and the positive electrode 12 include coated regions 11a and 12a, respectively, in which an active material is applied to a current collector including a metal foil, and uncoated regions 11b and 12b, respectively, that are exposed portions of the current collectors on which an active material is not applied.

The uncoated region 11b of the negative electrode 11 is formed at an end portion of one side of the negative electrode 11 along the spiral-wound electrode assembly 10. The uncoated region 12b of the positive electrode 12 is formed at an end portion of one side of the positive electrode 12 along the spiral-wound electrode assembly 10. The uncoated regions 11b and 12b are disposed at opposite ends of the electrode assembly 10.

The case 15 is formed in an approximate cuboid shape to provide a space that houses or accommodates the electrode assembly 10 therein. An opening of the case 15 is formed at one side thereof to enable the electrode assembly 10 to be inserted from the outside to an internal space.

The cap plate 20 is installed at (e.g., is coupled to) the opening of the case 15 to close and seal the case 15. For example, the case 15 and the cap plate 20 may be made of aluminum and may be welded to each other. In one embodiment, after the electrode assembly 10 is inserted into the case 15, the cap plate 20 is welded to the opening of the case 15.

Further, the cap plate 20 has at least one opening, for example, terminal openings H1 and H2 and a vent hole 24. The negative electrode terminal 21 and the positive electrode terminal 22 are installed at the terminal openings H1 and H2, respectively, in the cap plate 20 to be electrically connected to the electrode assembly 10.

For example, the negative electrode terminal 21 and the positive electrode terminal 22 are electrically connected to the negative electrode 11 and the positive electrode 12, respectively, of the electrode assembly 10. Therefore, the electrode assembly 10 is drawn out to the outside of the case 15 through the negative electrode terminal 21 and the positive electrode terminal 22.

In one embodiment, the negative electrode terminal 21 includes a first plate terminal 211c that is electrically connected to the electrode assembly 10, a second plate terminal 212c that is spaced from the first plate terminal 211c and may be connected to a busbar, and a fuse 21d that connects the first plate terminal 211c and the second plate terminal 212c to each other.

Because the fuse 21d is disposed at the outside of the cap plate 20, when the fuse 21d is cut (e.g., is activated or melted), an arc is prevented from occurring at the inside of the rechargeable battery 100. Therefore, in the rechargeable battery 100 according to the first exemplary embodiment, because the fuse 21d is provided at the outside of the rechargeable battery 100, a relatively complex configuration of a general external short circuit portion may not be necessary or required.

The first and second plate terminals 211c and 212c are disposed at the outside of the cap plate 20. The fuse 21d is at least partially surrounded (e.g., covered) by the insulating member 31 at the outside of the cap plate 20. Therefore, the fuse 21d is cut at the outside of the cap plate 20, and after the fuse 21d is cut, the fuse 21d will not become reconnected due to the presence of the insulating member 31. In one embodiment, the fuse may be completely surrounded or covered by the insulating member.

Figure 3:
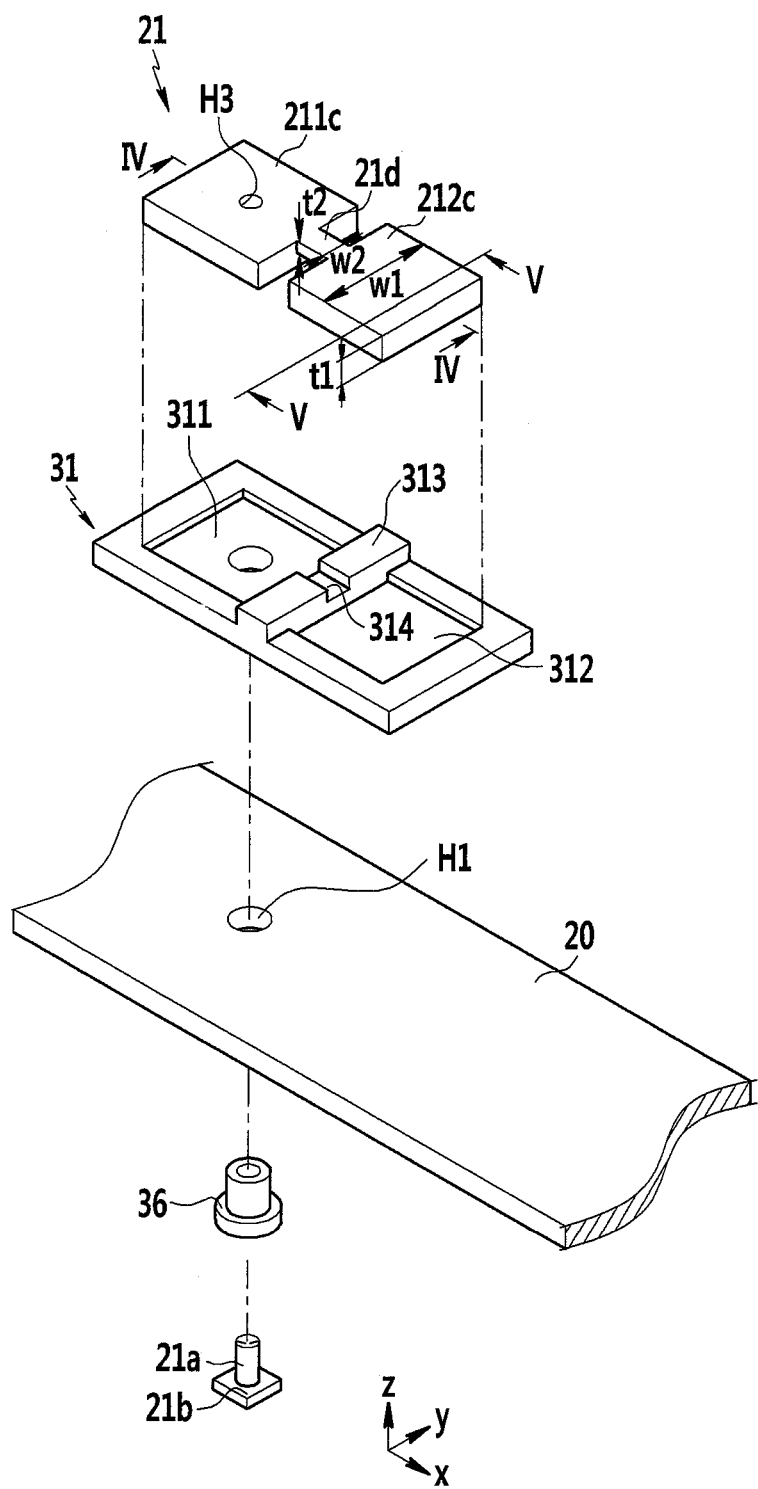
FIG. 3 is an exploded perspective view of a negative electrode terminal.
Figure 4:
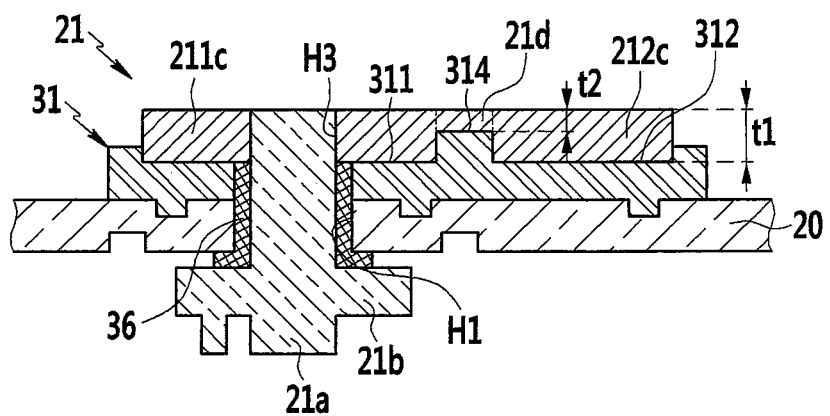
FIG. 4 is a cross-sectional view illustrating the negative electrode terminal taken along the line IV-IV of FIG. 3.
Figure 5:
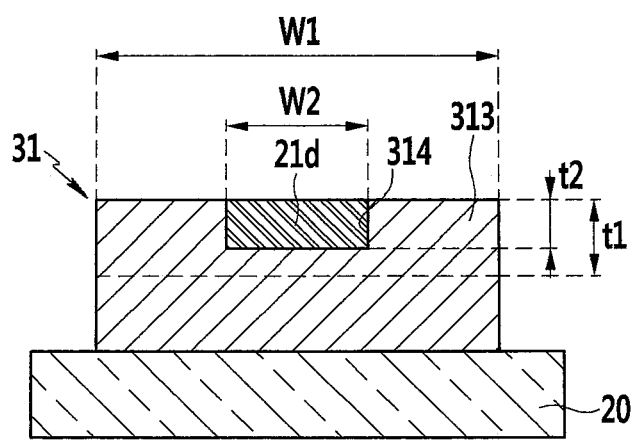
FIG. 5 is a cross-sectional view illustrating the negative electrode terminal taken along the line V-V of FIG. 3.

FIG. 3 is an exploded perspective view of a negative electrode terminal, FIG. 4 is a cross-sectional view illustrating the negative electrode terminal taken along the line IV-IV of FIG. 3, and FIG. 5 is a cross-sectional view illustrating the negative electrode terminal taken along the line V-V of FIG. 3.

Referring to FIGS. 3 to 5, the insulating member 31 includes a first receiving portion 311 that houses or accommodates the first plate terminal 211c, a second receiving portion 312 that houses or accommodates the second plate terminal 212c, and a cell barrier portion 313 between (e.g., connecting) the first receiving portion 311 and the second receiving portion 312 and that surrounds at least a portion of (e.g., covers) the fuse 21d.

The cell barrier portion 313 has a concave groove 314 which supports the fuse 21d and a side surface of the concave groove 314 at least partially surrounds (e.g., covers) the fuse 21d. Therefore, the fuse 21d may be supported by and at least partially surrounded by the cell barrier portion 313 and, in one embodiment, by the concave groove 314, to have a stable structure. The first receiving portion 311 and the second receiving portion 312 may communicate with each other through the concave groove 314 in the cell barrier portion 313.

The fuse 21d has a width W2 that is smaller than a width W1 of the first plate terminal 211c and/or the second plate terminal 212c. Further, the fuse 21d may have a thickness t2 that is less than a thickness t1 of the first and/or second plate terminals 211c and 212c.

The negative electrode terminal 21 further includes a rivet terminal 21a that is electrically connected to the negative electrode 11 of the electrode assembly 10. The rivet terminal 21a penetrates (e.g., extends through) the first receiving portion 311 and through an opening H3 (e.g., a through-hole) in the first plate terminal 211c.

Referring again to FIGS. 1 and 2, the positive electrode terminal 22 includes a rivet terminal 22a that is connected to the positive electrode 12 of the electrode assembly 10, a top plate 46 that is electrically connected to the cap plate 20, and a plate terminal 22c that electrically connects the top plate 46 and the rivet terminal 22a.

At the negative and positive electrode terminals 21 and 22, the rivet terminals 21a and 22a penetrate (e.g., extend through) the terminal openings H1 and H2, and upper ends of the rivet terminals 21a and 22a extend through openings H3 and H4 (e.g., through-holes), respectively. The negative and positive electrode terminals 21 and 22 further include flanges 21b and 22b that have a relatively large width and are integrally formed with the rivet terminals 21a and 22a, respectively, at the inside of the cap plate 20.

Referring to FIGS. 2 and 4, the insulation member 31 is interposed between the first and second plate terminals 211c and 212c and the cap plate 20 to electrically insulate the first and second plate terminals 211c and 212c and the cap plate 20. For example, the cap plate 20 maintains a state in which it is insulated from the electrode assembly 10 and the negative electrode 11.

By coupling (e.g., riveting or welding) the insulation member 31 and the first plate terminal 211c to the upper end portion of the rivet terminal 21a, the insulation member 31 and the first plate terminal 211c are fastened to the upper end portion of the rivet terminal 21a. The first plate terminal 211c is installed at the outside of the cap plate 20 with the first receiving portion 311 of the insulation member 31 interposed therebetween. The second plate terminal 212c is installed at the outside of the cap plate 20 with the second receiving portion 312 of the insulation member 31 interposed therebetween.

Referring to FIGS. 1 and 2, the conductive top plate 46 is interposed between the plate terminal 22c and the cap plate 20 and electrically connects the plate terminal 22c and the cap plate 20 to each other. For example, the cap plate 20 maintains a state in which it is electrically connected to the electrode assembly 10 and the positive electrode 12.

The rivet terminal 22a is insulated from the top plate 46 while penetrating through (e.g., extending through) the top plate 46 and the plate terminal 22c at the opening H4 (e.g., through-hole) therein.

By coupling (e.g., riveting or welding) the top plate 46 and the plate terminal 22c to the upper end portion of the rivet terminal 22a, the top plate 46 and the plate terminal 22c are fastened to the upper end portion of the rivet terminal 22a. The plate terminal 22c is installed at the outside of the cap plate 20 with the top plate 46 interposed therebetween.

Gaskets 36 and 37 are installed between the rivet terminals 21a and 22a of the negative electrode terminal 21 and the positive electrode terminal 22 and an inner surface of the terminal openings H1 and H2, respectively, in the cap plate 20, to seal and electrically insulate the rivet terminals 21a and 22a and the cap plate 20, from each other.

The gaskets 36 and 37 extend between the flanges 21b and 22b and the inside of the cap plate 20 to further seal and electrically insulate the flanges 21b and 22b and the cap plate 20 from each other. For example, the gaskets 36 and 37 prevent an electrolyte solution from leaking through the terminal openings H1 and H2.

Lead tabs 51 and 52 electrically connect the negative electrode terminal 21 and the positive electrode terminal 22 to the negative electrode 11 and the positive electrode 12, respectively, of the electrode assembly 10. For example, by coupling (e.g., caulking) the lead tabs 51 and 52 to the lower end portion of the rivet terminals 21a and 22a, while the lead tabs 51 and 52 are supported by the flanges 21b and 22b, the lead tabs 51 and 52 are connected to the lower end portion of the rivet terminals 21a and 22a, respectively.

Insulation members 61 and 62 are installed between the lead tabs 51 and 52 and the cap plate 20 to electrically insulate the lead tabs 51 and 52 and the cap plate 20 from each other, respectively. Further, one side of each of the insulation members 61 and 62 is coupled to the cap plate 20, and the insulation members 61 and 62 at least partially surround (e.g., enclose) the lead tabs 51 and 52, the rivet terminals 21a and 22a, and the flanges 21b and 22b, respectively, at the other side thereof, thereby providing a stabilized a connection structure.

The vent hole 24 is closed and sealed with a vent plate 25. If an internal pressure of the rechargeable battery 100 reaches a reference pressure (e.g., a predetermined pressure), the vent plate 25 is cut out (e.g., opens or bursts) to open the vent hole 24 in order to reduce the internal pressure and discharge gas generated by the electrode assembly 10. The vent plate 25 has a notch 25a that induces the cut out action (e.g., that induces the cut out action at the reference pressure).

The cap plate 20 further includes an electrolyte injection opening 27. The electrolyte injection opening 27 enables injection of an electrolyte solution into the case 15 after the cap plate 20 is coupled to the case 15. After the electrolyte solution is injected into the case 15, the electrolyte injection opening 27 is sealed by a seal stopper 29.

Hereinafter, a second exemplary embodiment of the present invention will be described. In the following description, constituent elements that are identical or similar to those of the first exemplary embodiment may not be described and dissimilar constituent elements may be primarily described. In the first exemplary embodiment, the fuse 21d is provided in the negative electrode terminal 21. In the second exemplary embodiment, a fuse 72d is provided in a positive electrode terminal 72.

Figure 6:
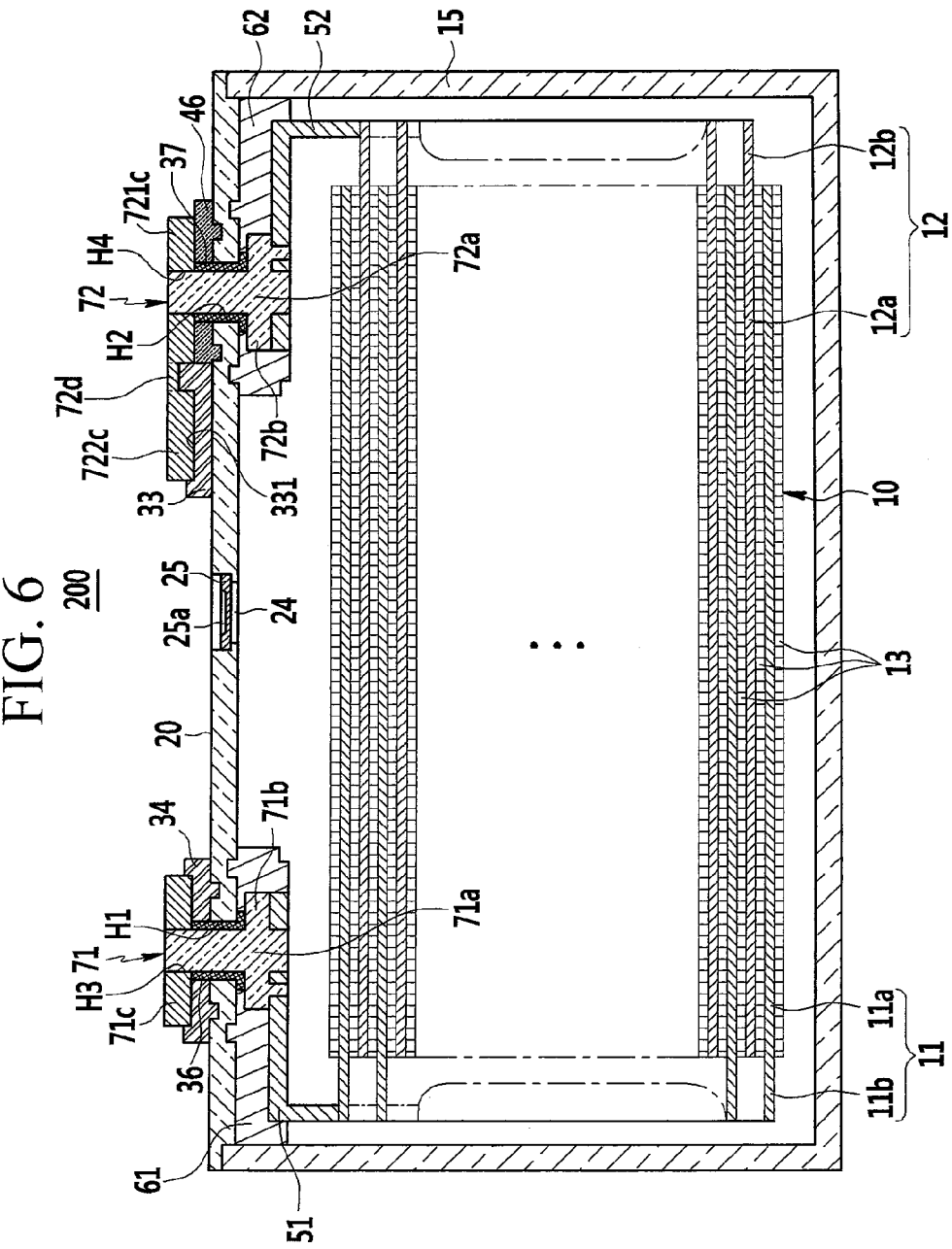
FIG. 6 is a cross-sectional view illustrating a rechargeable battery according to a second exemplary embodiment of the present invention.
Figure 7:
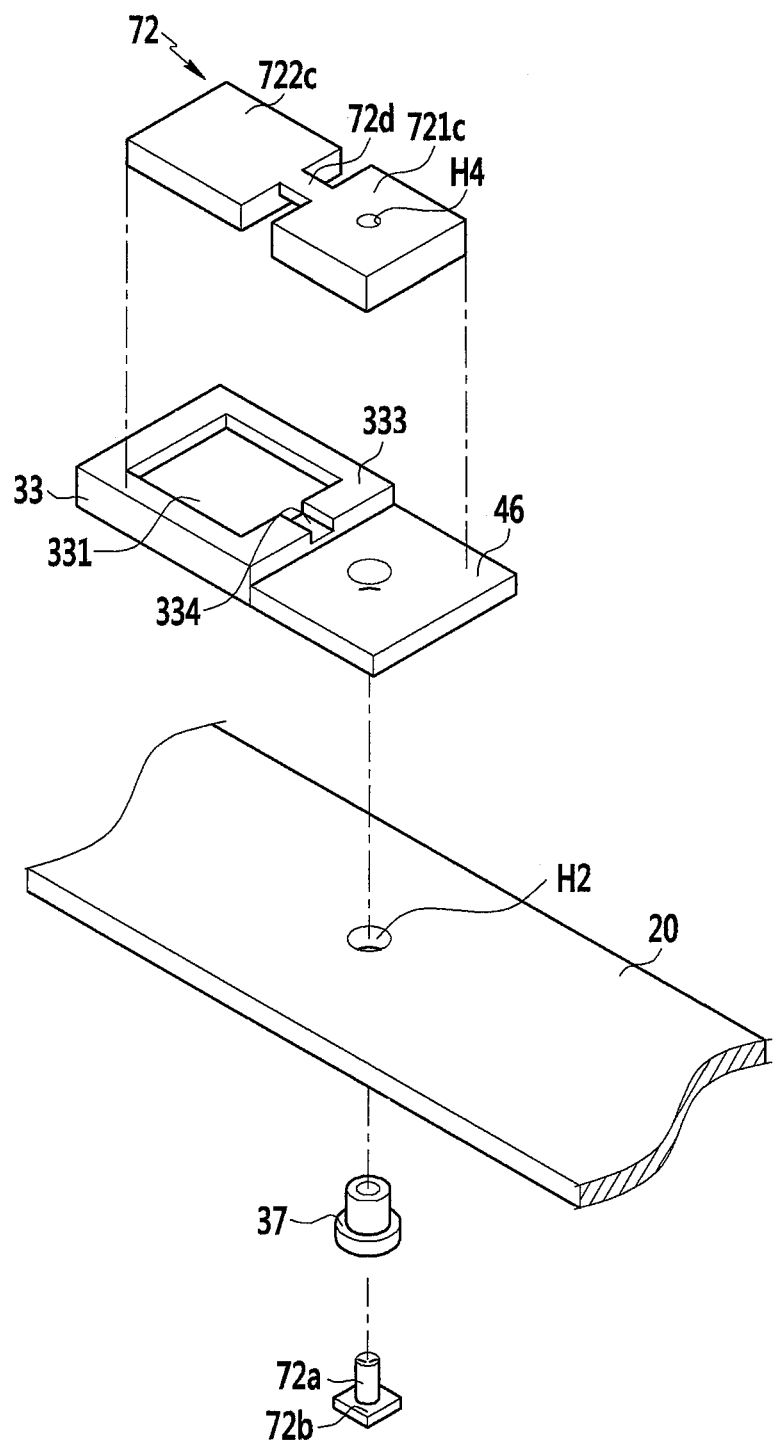
FIG. 7 is an exploded perspective view of a positive electrode terminal.

FIG. 6 is a cross-sectional view illustrating a rechargeable battery according to the second exemplary embodiment of the present invention, and FIG. 7 is an exploded perspective view of a positive electrode terminal. Referring to FIGS. 6 and 7, in a rechargeable battery 200 according to the second exemplary embodiment, the positive electrode terminal 72 includes a first plate terminal 721c that is electrically connected to an electrode assembly 10, a second plate terminal 722c that is spaced from the first plate terminal 721c and may be connected to a busbar, and the fuse 72d that connects (e.g., extends between) the first plate terminal 721c and the second plate terminal 722c.

Because the fuse 72d is disposed at the outside of a cap plate 20 (e.g., outside of the case 15), when the fuse 72d is cut, an arc is prevented from occurring inside of the rechargeable battery 200. Therefore, in the rechargeable battery 200 according to the second exemplary embodiment, because the fuse 72d is provided at the outside of the rechargeable battery 200, a relatively complex configuration of a general external short circuit portion may not be necessary.

The first and second plate terminals 721c and 722c are disposed at the outside of the cap plate 20. The fuse 72d is at least partially surrounded by (e.g., covered by) an insulating member 33 at the outside of the cap plate 20. Therefore, the fuse 72d is cut at the outside of the cap plate 20, and after the fuse 72d is cut, the fuse 72d will not be reconnected due to the insulating member 33 being between the cut portions of the fuse 72d.

The positive electrode terminal 72 includes a rivet terminal 72a that is connected to the positive electrode 12 of the electrode assembly 10 and a top plate 46 that is electrically connected to the cap plate 20. The rivet terminal 72a penetrates (e.g., extends through) the top plate 46 through an insulating structure to be fastened to the first plate terminal 721c at the opening H4.

The insulating member 33 includes a receiving portion 331 that houses or accommodates the second plate terminal 722c and a cell barrier portion 333 that at least partially surrounds (e.g., covers) the fuse 72d at one side of the receiving portion 331. The cell barrier portion 333 supports the fuse 72d with a concave groove 334 corresponding to the fuse 72d, and side surfaces of the concave groove 334 at least partially surround (e.g., cover) the fuse 72d.

By coupling (e.g., riveting or welding) the top plate 46 and the first plate terminal 721c to the upper end portion of the rivet terminal 72a, the top plate 46 and the first plate terminal 721c are fastened to the upper end portion of the rivet terminal 72a. In this embodiment, the second plate terminal 722c is installed at the outside of the cap plate 20 with the receiving portion 331 of the insulation member 33 interposed therebetween.

A negative electrode terminal 71 includes a rivet terminal 71a that is connected to a negative electrode 11 of the electrode assembly 10 and a plate terminal 71c that is electrically connected the rivet terminal 71a. The rivet terminal 71a penetrates an insulating member 34 and is fastened to the plate terminal 71c at an opening H3 in the plate terminal 71c.

For example, in the negative and positive electrode terminals 71 and 72, the rivet terminals 71a and 72a penetrate terminal openings H1 and H2 to be inserted into openings H3 and H4, respectively. The negative and positive electrode terminals 71 and 72 further include relatively wide flanges 71b and 72b that are integrally formed in the rivet terminal 71a and 72a, respectively, at the inside of the cap plate 20.

While the present invention has been described in connection with what is presently considered to be practical exemplary embodiments, it is to be understood that the present invention is not limited to the disclosed embodiments, but is intended to cover various modifications and equivalent arrangements included within the spirit and scope of the appended claims and their equivalents.

| Description of Some of the Reference Symbols | |
|---|---|
| 10: electrode assembly | 11: negative electrode |
| 11a, 12a: coated region | 11b, 12b: uncoated region |
| 12: positive electrode | 13: separator |
| 15: case | 20: cap plate |
| 21, 71: negative electrode terminal | |
| 22, 72: positive electrode terminal | |
| 21a, 22a, 71a, 72a: rivet terminal | 21b, 22b, 71b, 72b: flange |
| 21d, 72d: fuse | 22c, 71c: plate terminal |
| 24: vent hole | 25: vent plate |
| 25a: notch | 31, 33, 34: insulating member |
| 36, 37: gasket | 46: top plate |
| 51, 52: lead tab | 61, 62: insulating member |
| 100, 200: rechargeable battery | |
| 211c, 212c: first and second plate terminals | |
| 311, 312: first and second receiving portions | |
| 313, 333: cell barrier portion | |
| 314, 334: concave groove | 331: receiving portion |
| 721c, 722c: first and second plate terminals | H1, H2: terminal openings |
| H3, H4: openings | t1, t2: thickness |
| W1, W2: width | |

What is claimed is:
1. A rechargeable battery comprising:
an electrode assembly;

a case housing the electrode assembly;

a cap plate closing and sealing an opening of the case;

an electrode terminal at an outside of the cap plate with respect to the case, extending through an opening in the cap plate, and electrically connected to the electrode assembly; and an insulating member between the electrode terminal and the cap plate, wherein the electrode terminal comprises:
- a first plate terminal electrically connected to the electrode assembly;
- a second plate terminal spaced from the first plate terminal; and
- a fuse connecting the first plate terminal and the second plate terminal, wherein the insulating member comprises:
- a first receiving portion configured to accommodate the first plate terminal;
- a second receiving portion configured to accommodate the second plate terminal; and
- a cell barrier portion between the first receiving portion and the second receiving portion and at least partially surrounding the fuse, and wherein the fuse is at least partially surrounded by the insulating member.

2. The rechargeable battery of claim 1, wherein the cell barrier portion has a concave groove configured to support the fuse, and side surfaces of the concave groove at least partially surround the fuse.

3. The rechargeable battery of claim 2, wherein the electrode terminal comprises a negative electrode terminal connected to a negative electrode of the electrode assembly and a positive electrode terminal connected to a positive electrode of the electrode assembly, wherein the negative electrode terminal comprises a rivet terminal connected to the negative electrode, and wherein the rivet terminal extends through the first receiving portion and an opening in the first plate terminal to be coupled thereto.

4. The rechargeable battery of claim 3, wherein the positive electrode terminal comprises:
a rivet terminal connected to the positive electrode;
a top plate electrically connected to the cap plate; and
a plate terminal electrically connecting the top plate and the rivet terminal, wherein the rivet terminal extends through and is insulated from the top plate and is connected to the plate terminal at an opening therein.

5. The rechargeable battery of claim 2, wherein the fuse has a smaller width than that of the first plate terminal or the second plate terminal.

6. The rechargeable battery of claim 5, wherein the fuse has a smaller thickness than that of the first plate terminal or the second plate terminal.

7. The rechargeable battery of claim 1, wherein the electrode terminal comprises a negative electrode terminal connected to a negative electrode of the electrode assembly and a positive electrode terminal connected to a positive electrode of the electrode assembly, wherein the positive electrode terminal comprises:
a rivet terminal connected to the positive electrode; and
a top plate electrically connected to the cap plate, and wherein the rivet terminal extends through and is insulated from the top plate and is connected to the first plate terminal at an opening therein.

8. The rechargeable battery of claim 7, wherein the insulating member comprises:
a receiving portion housing the second plate terminal; and
a cell barrier portion at least partially surrounding the fuse and being at one side of the receiving portion.

9. The rechargeable battery of claim 8, wherein the cell barrier portion has a concave groove supporting the fuse, and side surfaces of the concave groove at least partially surround the fuse.

10. The rechargeable battery of claim 9, wherein the negative electrode terminal comprises a rivet terminal connected to the negative electrode, and the rivet terminal extends through the insulating member and is connected to a plate terminal at an opening therein.

* * * * *